April 28, 1964    J. VAN POOL    3,131,031
FEED DEVICE FOR MOVING BED CATALYTIC PROCESS
Filed Nov. 2, 1960
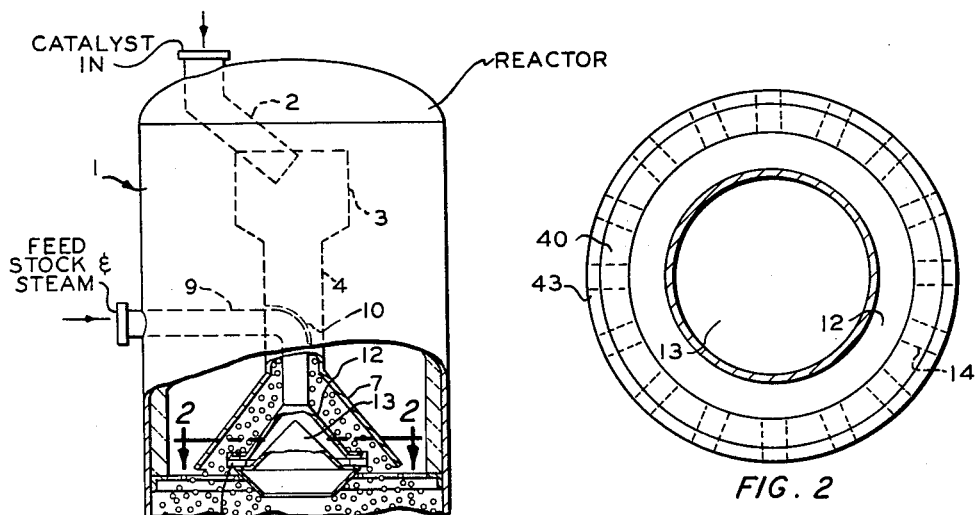
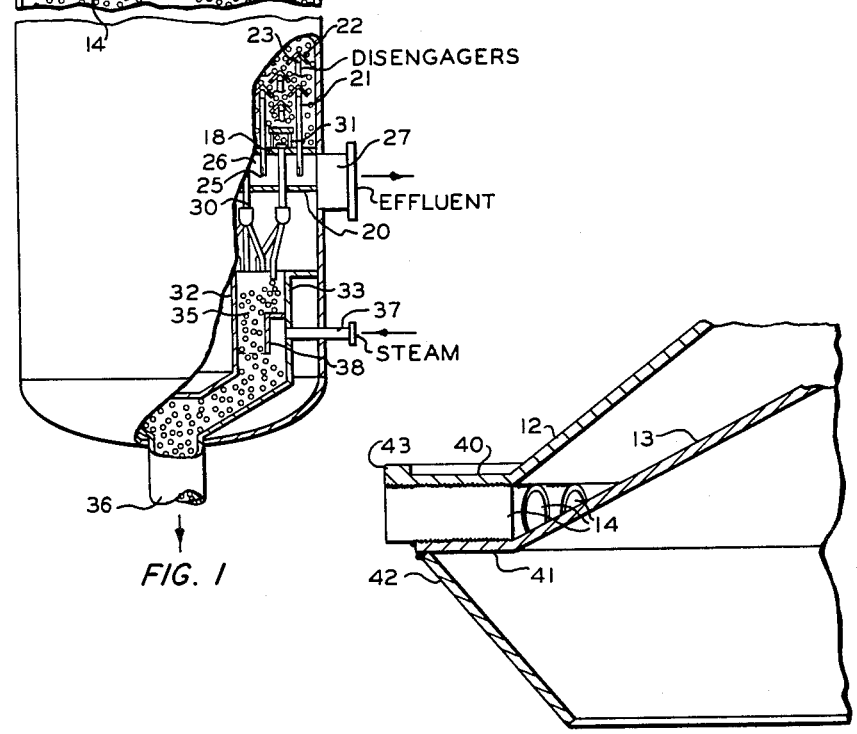
FIG. 1
FIG. 2
FIG. 3
INVENTOR.
JOE VAN POOL
BY *Hudson & Young*
ATTORNEYS 3,131,031
FEED DEVICE FOR MOVING BED
CATALYTIC PROCESS
Joe Van Pool, Bartlesville, Okla., assignor to Phillips Petroleum Company, a corporation of Delaware
Filed Nov. 2, 1960, Ser. No. 66,823
10 Claims. (Cl. 23—288)

This invention relates to an improved means for introducing a feed stock and catalyst into a catalytic process system.

In one aspect, this invention relates to improved flow directing means to provide even contact of the feed stock and the catalyst. In another aspect, this invention relates to the combination of catalyst feed means, reactant feed means and improved baffle means to direct the catalyst and the reactant into even, well-distributed contact with each other.

In many processes, a feed stream is contacted with a solid particulate material in an enclosed vessel to effect thermal and/or catalytic treatment of the feed stream. Often, the vessel is arranged vertically with the solid particulate material in an upper portion, removed at a lower portion and the flow controlled so that a downwardly moving mass of particulate solid material is maintained within the vessel. In the introduction of the feed stream, it is important that the stream be distributed uniformly through the solid particles. Non-uniform distribution results in inefficient operation, deposits on the catalyst, channeling and resulting uneven flow, etc. Where the deposit on the catalyst is coke, as often occurs where the feed stream is a hydrocarbon, regeneration of the spent catalyst results in localized hot spots due to the burning off of the coke and such overheating of the catalyst is detrimental.

It is an object of this invention to provide uniform distribution and contact of feed with a moving catalyst bed. Another object of this invention is to prevent excessive coking on a catalyst used in the catalytic conversion of hydrocarbons.

Other aspects, objects and the several advantages of this invention will be apparent from a study of this disclosure, the drawings and the appended claims.

According to the present invention, the contact of a reactant and a moving bed of solid particles is made more uniform by providing reactant and solid material distributing means. Also, according to this invention, an inverted conical baffle is provided beneath a plurality of reactant feed conduits. Further, according to this invention, there are provided the combination of a plurality of reactant distribution conduits, a baffle above the conduits to prevent by-passing of downwardly flowing solid particulate material between the conduits, and the inverted conical baffle beneath the conduits to further distribute the downwardly flowing solid and prevent by-passing and uneven distribution of the reactant in the solid material. According to this invention, the baffle means above the conduits may be provided with retaining means which contain on the baffle a layer of the solid particles to prevent erosion of the baffle by the downwardly flowing mass of particles.

A particular feature of my invention is the combination of an upper generally horizontal baffle above the distribution conduits and a baffle having a conical portion below the conduits and this combination has proved to be very effective in providing uniform contact between the reactant and the catalyst. However, I have found that the upper baffle alone provides very good results in some instances. Another embodiment of my invention comprises a generally horizontal baffle immediately below the distribution conduits, in combination with an inverted conical baffle.

In the drawing, FIGURE 1 is a partially schematic vertical cross section of a reactor incorporating the apparatus of the present invention. FIGURE 2 is a plan view taken along the line 2—2 of FIGURE 1 and illustrates the radial feed conduits and the baffle immediately above these conduits. FIGURE 3 is a verical cross section of one of the radial feed conduits and the lower portion of the feed discharge unit and the baffles which properly distribute the feed and solid material.

Solid particles, for example, in the form of pellets or beads, are introduced into reactor 1 via downleg 2, hopper 3 and downleg 4 into cone 7 and thence into the cylindrical portion of reactor 1. The reactant is fed through conduit 9 into the space between a pair of cones 12 and 13 and subsequently through radial conduits 14. The elbow of feed conduit 9 is protected by an erosion-resistant patch 10. Conduits 14 may all be of the same length or may alternate in short and long lengths, depending on the size of the unit, the solid material being contacted, etc., to obtain the best possible distribution of the reactant. The solid material moving downwardly through the unit forms a compact bed supported by a horizontal grid plate 18. A plurality of spaced vapor disengager tubes 21 extend through grid 18 with their lower ends terminating a short distance below it. Each disengager is covered by an inverted cup-shaped member 22 or angle iron which acts as an umbrella, permitting the vapors, along with some solid fines, to be drawn in through orifices 23 without obstruction from the main catalyst mass. Disengagers 21 are notched near their base to form discharge ports 25 through which vapors are discharged into the vapor space 26 between grid 18 and lower plate 20 for passage through effluent nozzle 27 to suitable fractionating means not shown. The solid material is drawn off from the bed into the underlying stripping section through a plurality of downcomer pipes 30. Downcomer pipes 30 are partially covered by members 31 to provide a funneling action for the passage of catalyst particles thereto and to prevent bridging of the catalyst bed over the tops of the downcomers.

The stripping section consists mainly of two concentric hoppers 32 and 33, the intervening space being divided into a number of cells 35. Each catalyst downcomer pipe 30 discharges into an individual cell. Inner hopper 32 tapers to a conical base, as does hopper 33, the latter discharging into stand pipe 36 for passage into the regeneration zone. Catalyst particles pass through the cells 35 as a plurality of compact columns and are stripped therein by steam entering the reactor through line 37 and discharging into hopper 33. Baffle ring 38 projecting from the inner wall of cylinder 33 forces the incoming steam downwardly and toward the center of cells 35. From this point, it flows up through the individual cells. Stripped catalyst is withdrawn from the reactor into stand pipe 36. The fines, together with stripped reactant vapors, are entrained by the stripping steam passing through the several cells and collect, in part, within inner hopper 32. The latter may, if necessary, be periodically evacuated by means such as those described in U.S. 2,893,949, R. T. Prater, issued July 7, 1959.

The radial outlets 14 are provided with a horizontal annular baffle 40 which may conveniently constitute an extension of the cone 12. A baffle means is provided below outlets 14, the lower baffle means comprising a horizontal portion 41 and a conical portion 42. This latter conical portion may be a truncated conical surface as illustrated or may be a complete cone. In some installations, it has been found desirable to provide baffle 40 with an upwardly extending lip 43, as shown, to contain an amount of the downwardly flowing solid particles in place on the top of baffle 40 to prevent erosion thereof by the solid material.

Baffle 40 prevents flow of the solid material between the outlets 14, thus preventing by-passing and the uneven distribution of the feed to the solid material. Baffle 41, in combination with baffle 42, provides a retaining wall for the downflowing solid material, preventing migration of the reactant through the inner edge of the body of solid material. In this way, it has been found that greatly improved distribution of the reactant into the body of solid material is obtained and by-passing and resultant under-and-over contact with the solid material is avoided.

To permit the desired downward flow of solids and to prevent void space between the solids and the wall of the distribution means, the cone 7 has an angle with the horizontal greater than the angle of repose of the solids flowing therethrough. Similarly, baffle 42 also has an angle greater than the angle of repose of the solids. The angle of cones 12 and 13 is less critical, although, to maintain a smooth flow through the unit, it is desirable that the cone 12 be very nearly parallel with the cone 7. The angle of repose of the solid material being used normally will fall within the range of 30–40°.

In a preferred embodiment of the invention, reactor 1 is a catalytic cracking unit, the feed stock is a topped hydrocarbon crude, and the catalyst is acid treated clay. In this operation, one of the advantages is the elimination of excess coking on a portion of the clay catalyst, thus avoiding overheating of the catalyst when it is regenerated. The unit may also be used to effect such processes as catalytic reforming, dehydrogenation, desulfurization, etc.

The combination of upper baffle 40 and the lower assembly comprising baffles 41 and 42 has particular utility in the catalytic cracking unit described above and this combination is an important feature of my invention. However, in some instances, the baffle 40 alone, either with or without lip 43 may be used, especially where uneven distribution below the vicinity of radial outlets 14 is not a serious problem. In other instances baffle 40 can be eliminated, lower assembly baffle 41 and baffle 42 serving to regulate reactant and catalyst distribution. In the latter instance, normally a layer of catalyst collects on top of baffle 41, whereby there is no circulation of catalyst in this area. Therefore, although there may be some local over contacting, this effects a very minor amount of catalyst and, after a comparatively brief period during start up, this portion of the catalyst becomes ineffective, due to coking for example, and has no effect on the reactant.

In a test made to determine the effectiveness of my invention a temperature traverse was taken across the diameter of a reactor before and after modification to incorporate the invention. The reactor was an 11-foot diameter thermofor catalytic cracking unit similar to the illustration of FIGURE 1, and a particulate silica-alumina catalyst flowed downwardly therethrough in a contiguous mass. Prior to the modification radical conduits 14 extended outwardly from cones 12 and 13 as illustrated, but horizontal baffle 40 and the lower baffle means comprising 41 and 42 were not installed. The same unit was modified by the installation of these baffles as illustrated in FIGURE 3 for the later portion of the test. In both instances a topped crude was charged as the feed and this material was cracked to produce a predominantly gasoline boiling range product. Results of the temperature traverse made before and after are contained in Table I below:

Table I

|  | Unmodified, °F. | Modified, °F. |
| --- | --- | --- |
| Outer Wall | 950 | 906 |
| 5 ft | 910 | 885 |
| 4 ft | 890 | 885 |
| 3 ft | 903 | 885 |
| 2 ft | 960 | 904 |
| 1 ft | 1,012 | 934 |
| Center | 990 | 925 |
| 1 ft | 1,010 | 938 |
| 2 ft | 992 | 930 |
| 3 ft | 920 | 885 |
| 4 ft | 898 | 888 |
| 5 ft | 886 | 905 |
| Outer Wall | 894 | 930 |

These traverses were made at a point immediately above the disengager tubes 21. It will be seen that after the modification according to my invention there was a much smaller variation in the temperatures obtained at the various positions along the diameter of the unit, the maximum variation between maximum and minimum in the prior unit being 126° F. while the maximum variation after the modification is 53° F. Thus the variation between maximum and minimum was reduced to less than half the prior value. The value of the invention is underscored when it is realized that the ideal temperature range for a cracking operation of this type is between 880 and 930° F. It will be seen that the actual range obtained, that is 885 to 938° F., very closely approximates this ideal range.

Reasonable variation and modification are possible within the scope of the foregoing disclosure, the drawing, and the appended claims to the invention the essence of which is an improved fluid-solid contact means, the means comprising a space enclosing a down-flowing solid particulate material, radial outlets for distributing the fluid into the solid material, the conduits being baffled to prevent flow of the solid material between the conduits and being provided with an inverted conical member below the conduits.

I claim:

1. In a catalytic process unit, in combination, a conduit extending into the upper portion of the unit for the admission of catalyst particles thereto, a feed inlet pipe extending into said conduit and depending therein, said conduit and said feed inlet pipe defining an annular space through which a stream of catalyst particles is permitted to flow downwardly in the form of a compact moving bed, said feed inlet pipe terminating at its lower end in a feed discharge unit within the discharge end of said conduit, said conduit tapering outwardly at said discharge end to form a conical outlet, the angle of the conical wall of said conical outlet with the horizontal being greater than the angle of repose of the catalyst particles to prevent void spaces around said stream of catalyst particles moving past said feed unit, said unit comprising a pair of concentric cones within said conical outlet, said pair of concentric cones separated by a second annular space which communicates with said feed inlet pipe, the inner cone of said pair serving to deflect incoming feed toward a plurality of horizontally directed radial outlet conduits positioned in the lower periphery of said second annular space, the outer cone of said pair terminating in a first horizontal annular baffle positioned and dimensioned to cover the area of said radial outlet conduits, the inner cone of said pair terminating in a second horizontal annular baffle beneath the area of said radial outlet conduits, an inverted conical baffle depending from the periphery of said second horizontal annular baffle, said inverted conical baffle having an angle with the horizontal greater than the angle of repose of the catalyst particles.

2. In a catalytic process unit, in combination, a conduit extending into the upper portion of the unit for the admission of catalyst particles thereto, a feed inlet pipe extending into said conduit and depending therein, said conduit and said feed inlet pipe defining an annular space through which a stream of catalyst particles is permitted to flow downwardly in the form of a compact moving bed, said feed inlet pipe terminating at its lower end in a feed discharge unit within the discharge unit of said conduit, said conduit tapering outwardly at said discharge end to form a conical outlet, the angle of the wall of said conical outlet with the horizontal being greater than the angle of repose of the catalyst particles to prevent void spaces around said stream of catalyst particles moving past said feed discharge unit, said discharge unit comprising a pair of concentric cones within said conical outlet, said pair of concentric cones separated by a second annular space which communicates with said feed inlet pipe, the inner cone of said pair serving to deflect incoming feed toward a plurality of horizontally directed radial outlet conduits positioned in the lower periphery of said second annular space, baffle means above said radial outlet conduits to direct flow of said catalyst particles across the exit ends of said outlet conduits and to prevent flow of catalyst downwardly between said conduits, baffle means beneath said radial outlet conduits, said baffle means comprising an inverted conical member, the conical wall of said member having an angle with the horizontal greater than the angle of repose of the catalyst particles.

3. In a catalytic process unit, in combination, a conduit extending into the upper portion of the unit for the admission of catalyst particles thereto, a feed inlet pipe extending into said conduit and depending therein, said conduit and said feed inlet pipe defining an annular space through which a stream of catalyst particles is permitted to flow downwardly in the form of a compact moving bed, said feed inlet pipe terminating at its lower end in a feed discharge unit within the discharge end of said conduit, said conduit tapering outwardly at said discharge end to form a conical outlet, the angle of the conical wall of said conical outlet with the horizontal being greater than the angle of repose of the catalyst particles to prevent void spaces around said stream of catalyst particles moving past said feed unit, said unit comprising a pair of concentric cones within said conical outlet, said pair of concentric cones separated by a second annular space which communicates with said feed inlet pipe, the inner cone of said pair serving to deflect incoming feed toward a plurality of horizontally directed radial outlet conduits positioned in the lower periphery of said second annular space, the outer cone of said pair terminating in a first horizontal annular baffle positioned and dimensioned to cover the area of said radial outlet conduits, a lip on the periphery of said first horizontal annular baffle, said lip serving to retain upon said first horizontal annular baffle a quantity of the downward flowing solid particles, the inner cone of said pair terminating in a second horizontal annular baffle beneath the area of said radial outlet conduits, an inverted conical baffle depending from the periphery of said second horizontal annular baffle, said inverted conical baffle having an angle with the horizontal greater than the angle of repose of the catalyst particles.

4. Means for distributing a fluid material into a mass of particulate solid material comprising a conical surface having a horizontal angle greater than the angle of repose of the solid particulate material, an inner conical surface, said inner conical surface and said conical surface defining a flow path for the particulate solid material, fluid distribution means comprising outwardly directed radial conduits for injecting fluid into the particulate solid material near the lower end of said conical surface, baffle means above said radial conduits to direct flow of said particulate solid material across the exit ends of said outwardly directed radial conduits and to prevent flow of said solid material between said conduits, baffle means beneath said radial outlet conduits comprising an inverted conical member, the conical wall of said inverted member having an angle with the horizontal greater than the angle of repose of the solid material.

5. Means for distributing a fluid material into a compact mass of particulate solid material comprising outwardly directed generally radial conduits for injecting fluid into a downwardly moving compact mass of particulate solid material, means to direct said material in an annular zone adjacent said conduits, and a generally horizontal annular baffle above said conduits, substantially covering said conduits and the space between them and terminating at the exit end of said conduits whereby said particulate solid material is directed through the zone wherein fluid is being injected.

6. Means for distributing a fluid material into a compact mass of particulate solid material comprising outwardly directed generally radial conduits for injecting fluid into a downwardly moving compact mass of particulate solid material, a generally horizontal annular baffle below said conduits, an inverted conical baffle depending from the periphery of said annular baffle, said conical baffle having an angle with the horizontal greater than the angle of repose of said particulate solid material.

7. Means for distributing a fluid material into a compact mass of particulate solid material comprising outwardly directed generally radial conduits for injecting fluid into a downwardly moving compact mass of particulate solid material, means to direct said material in an annular zone adjacent said conduits, and a generally horizontal annular baffle above said conduits, a lip on the periphery of said annular baffle to retain a quantity of said particulate solid material thereon, substantially covering said conduits and the space between them and terminating at the exit end of said conduits whereby said particulate solid material is directed through the zone wherein fluid is being injected.

8. Means for distributing a fluid material into a downwardly moving compact mass of particulate solid material, a generally horizontal annular baffle below said conduits, a lip on the periphery of said annular baffle to retain a quantity of said particulate solid material thereon, an inverted conical baffle depending from the periphery of said annular baffle, said conical baffle having an angle with the horizontal greater than the angle of repose of said particulate solid material.

9. In a catalytic process unit, in combination, a conduit extending into the upper portion of the unit for the admission of catalyst particles thereto, a feed inlet pipe extending into said conduit and depending therein, said conduit and said feed inlet pipe defining an annular space through which a stream of catalyst particles is permitted to flow downwardly in the form of a compact moving bed, said feed inlet pipe terminating at its lower end in a feed discharge unit within the discharge end of said conduit, said conduit tapering outwardly at said discharge end to form a conical outlet, the angle of the conical wall of said conical outlet with the horizontal being greater than the angle of repose of the catalyst particles to prevent void spaces around said stream of catalyst particles moving past said feed unit, said unit comprising a pair of concentric cones within said conical outlet, said pair of concentric cones being separated by a second annular space which communicates with said feed inlet pipe, the inner cone of said pair serving to deflect incoming feed toward a plurality of horizontally directed radial outlet conduits positioned in the lower periphery of said second annular space, the outer cone of said pair terminating in a horizontal annular baffle positioned and dimensioned to cover the area of said radial outlet conduits.

10. In a catalytic process unit, in combination, a conduit extending into the upper portion of the unit for the admission of catalyst particles thereto, a feed inlet pipe extending into said conduit and depending therein, said conduit and said feed inlet pipe defining an annular space through which a stream of catalyst particles is permitted to flow downwardly in the form of a compact moving bed, said feed inlet pipe terminating at its lower end in a feed discharge unit within the discharge end of said conduit, said conduit tapering outwardly at said discharge end to form a conical outlet, the angle of the conical wall of said conical outlet with the horizontal being greater than the angle of repose of the catalyst particles to prevent void spaces around said stream of catalyst particles moving past said feed unit, said unit comprising a pair of concentric cones within said conical outlet, said pair of concentric cones being separated by a second annular space which communicates with said feed inlet pipe, the inner cone of said pair serving to deflect incoming feed toward a plurality of horizontally directed radial outlet conduits positioned in the lower periphery of said second annular space, the inner cone of said pair terminating in a horizontal annular baffle beneath the area of said radial outlet conduits, an inverted conical baffle depending from the periphery of said horizontal annular baffle, said inverted conical baffle having an angle with the horizontal greater than the angle of repose of the catalyst particles.

References Cited in the file of this patent

UNITED STATES PATENTS

| | | |
|---|---|---|
| 2,492,999 | Lassiat | Jan. 3, 1950 |
| 2,493,036 | Savage et al. | Jan. 3, 1950 |
| 2,556,198 | Lassiat | June 12, 1951 |
| 2,842,430 | Bishop | July 8, 1958 |
| 2,956,010 | Buckner | Oct. 11, 1960 |